United States Patent [19]
Blatt

[11] 3,798,985
[45] Mar. 26, 1974

[54] CAM PIN PLUNGER CLAMP

[76] Inventor: Leland F. Blatt, 821 Lakeshore Dr., Grosse Pointe Woods, Mich. 48236

[22] Filed: Aug. 28, 1972

[21] Appl. No.: 284,409

[52] U.S. Cl. ................................................ 74/102
[51] Int. Cl. ......................................... F16h 21/44
[58] Field of Search ...................... 74/102, 103, 519

[56] References Cited
UNITED STATES PATENTS
| 1,898,348 | 2/1933 | Dorer | 74/519 |
| 102,452 | 4/1870 | Wadsworth | 74/102 |
| 1,731,764 | 10/1929 | Coffin | 74/103 |

FOREIGN PATENTS OR APPLICATIONS
| 582,432 | 10/1924 | France | 74/102 |

Primary Examiner—Benjamin W. Wyche
Assistant Examiner—Wesley S. Ratliff, Jr.
Attorney, Agent, or Firm—Cullen, Settle, Sloman & Cantor

[57] ABSTRACT

A cam pin plunger clamp has a body mountable on a support having a first longitudinal bore of a polygonal cross section and a second intersecting bore defining internal handle guide walls. Opposed cam guide slots are formed in said walls and are adapted to guidably receive the ends of a cam pin projected through the handle. The handle is nested within the body and at one end is pivotally connected to the plunger whereby, with pivotal movements of the handle with respect to the body, the plunger is projected and alternately retracted therein.

8 Claims, 8 Drawing Figures

FIG. 6    FIG. 5
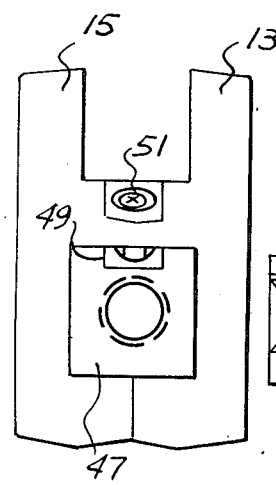 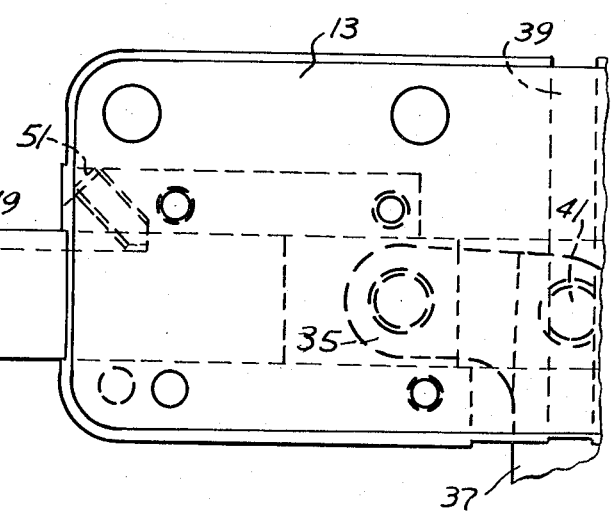
FIG. 8    FIG. 7
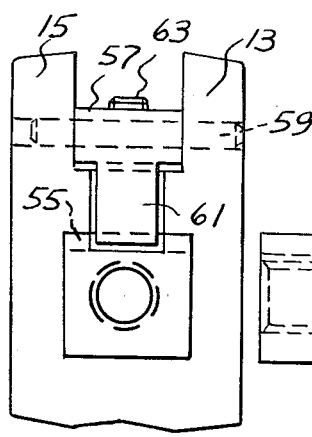 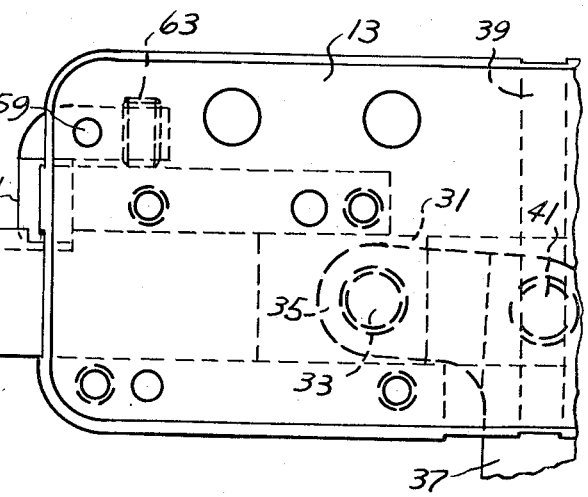

CAM PIN PLUNGER CLAMP

BACKGROUND OF THE INVENTION

Heretofore, various types of plunger clamps have been provided wherein the plunger is in one manner or another guidably positioned within a body and where a linkage is provided for interconnecting a pivotal handle with the plunger for accomplishing forward locking and retracting movements thereof.

BRIEF DESCRIPTION OF THE INVENTION

It is an object of the present invention to provide an improved cam pin plunger clamp wherein the linkage aforesaid is omitted and wherein there is a direct connection between the handle and the plunger and wherein certain cam guide means are employed interconnecting the body and handle so that pivotal movements of the handle will cause retracting and forward movements of the plunger.

This and other objects will be seen from the following specification and claims in conjunction with the appended drawings.

THE DRAWINGS

FIG. 5 is a fragmentary side elevational view of a modified plunger clamp;

FIG. 6 is a left end elevational view thereof;

FIG. 7 is a fragmentary side elevational view of a further modified plunger clamp;

FIG. 8 is a left elevational view thereof.

Figure 1:
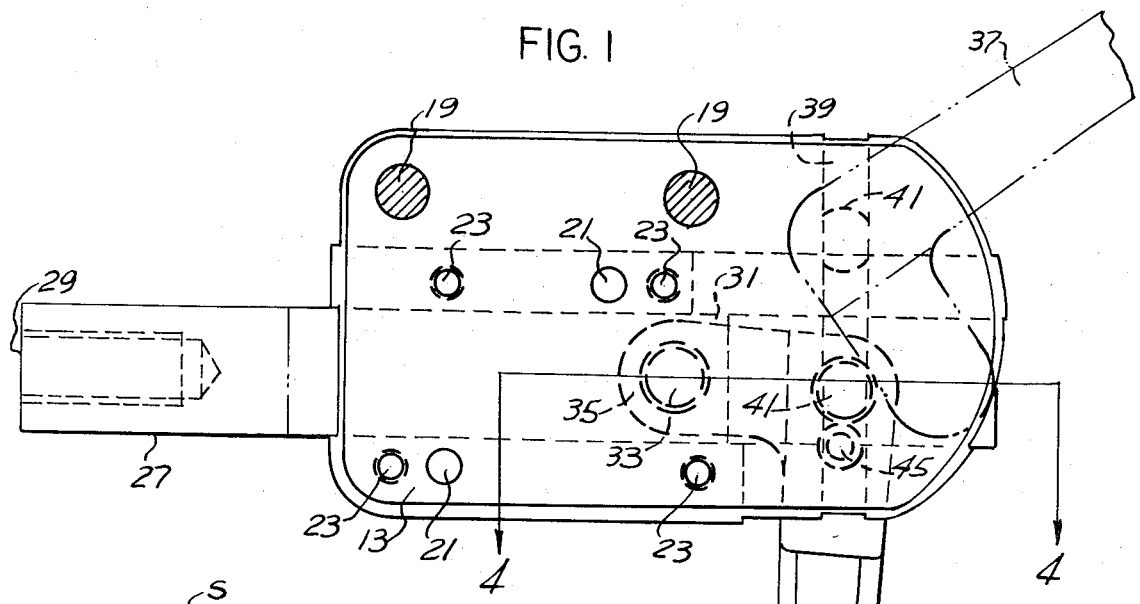
FIG. 1 is a side elevational view of the present cam pin plunger clamp with the plunger in forward work piece securing position.

It will be understood that the above drawings illustrate merely several preferred embodiments of the invention and that other embodiments are contemplated within the scope of the claims hereafter set forth.

DETAILED DESCRIPTION OF THE INVENTION

The present cam pin plunger clamp includes a body 11 having a pair of symmetrically opposite body plates 13 and 15, which may be forgings and which are so formed as to define the internal slot 17 at the top thereof adapted to receive a portion of the support S fragmentarily shown and secured thereto by fasteners 19.

Dowels 21 interconnect the body plates which are secured together as a unit by a series of fasteners 23 extending between said plates.

Figures 2, 3:
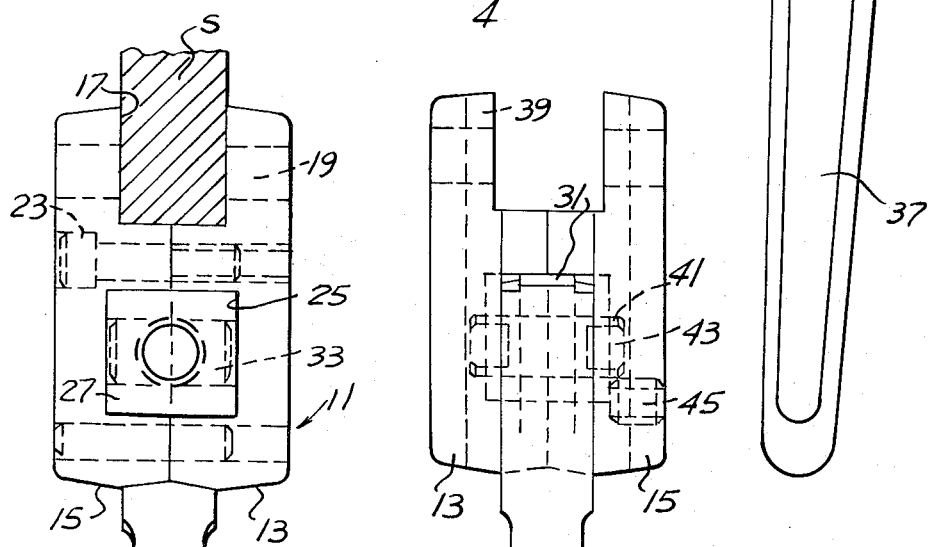
FIG. 2 is a left end elevational view thereof with a portion of the support therefore fragmentarily shown in cross section.
FIG. 3 is a right end elevational view thereof.
Figure 4:
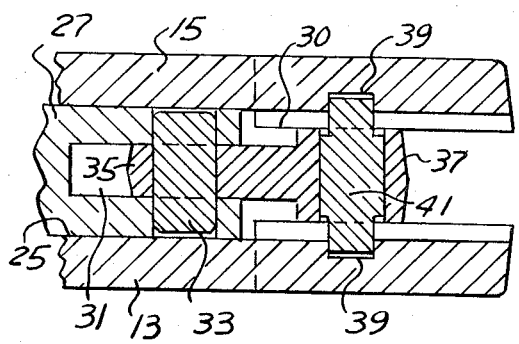
FIG. 4 is a fragmentary section taken in the direction of arrows 4—4 of FIG. 1.

Internal portions of said body plates are so formed as to define when assembled as shown in FIG. 2 a first longitudinal bore 25 of polygonal cross section shown as square in the illustrative embodiment and adapted to receive the reciprocal plunger 27 of similar cross section.

Said plunger at its forward end has a threaded bore 29 adapted to receive a suitable clamping means such as clamp fingers or other details adapted to operatively or retainingly engage a work piece, not shown.

The body plates 13 and 15 upon their interior are provided with a second upright bore adjacent one end thereof as shown which intersects the first bore 25 and defines upon the interior of the body the handle guide walls to cooperatively receive handle 37.

As one means of pivotally interconnecting the handle and plunger is provided a slot or forked end 31 on the inner end of said plunger adapted to receive one end 35 of the L-shaped handle 37 pivotally interconnected by the transverse pin 33, FIGS. 1 and 2.

Communicating with the second bore defining the internal handle guide walls are a pair of opposed pin guide slots 39 formed upon the interior of the body adapted to receive the ends of the cam pin 41, FIG. 3 which extends through an intermediate portion of said handle for operative sliding engagement within slots 39.

In the illustrative embodiment, FIG. 3, there is shown a pair of axially disposed hardened inserts 43 within the ends of the cam pin 41 adapted to engage the body.

A suitable handle stop 45, in the form of a roll pin, projects laterally inward of a portion of the body and into one of the cam pin slots 39, and registerable with the cam pin serving as a stop for the handle when pivoted to locking position shown in solid lines and with the plunger projected forwardly as shown in FIG. 1.

In operation to retract the plunger, the handle is rotated to the dotted line position shown in FIG. 1 with the cam guide pins operably and guidably nested within cam guide slots 39 upon the interior of the body.

It is noted that the stop 45 is so located with respect to the body that when the handle comes to rest with the cam guide pin bearing against said stop, the center line of the cam guide pin is below the center line of the plunger, thus, providing a locking angle for the handle so that any pressure horizontally against the plunger tending to retract the same will keep the said pin below the center line and with the plunger locked in its forward position, FIG. 1.

MODIFICATION

A modified body construction for a plunger clamp is shown in FIGS. 5 and 6, wherein, upon and along the top surface of the plunger 47 is a milled, or otherwise formed longitudinal slot 49. Pre-stop screw 51 is threaded angularly inward and downward through said body so that its end extends into plunger slot 49 for operative engagement with said plunger.

By adjusting the screw, a pre-set pressure can be applied to the longitudinal angle of the plunger in its forward position, removing all slop from the plunger and guaranteeing the security of cam pin 41 against its stop 45 to remain in locked position.

MODIFICATION

A further modification of pre-stop is shown in FIGS. 7 and 8 wherein the pre-stop assembly includes a modified plunger 53 having a longitudinal slot 55 in its top surface and wherein the pre-stop of L-shape has a trunion 57 which by a pivot pin 59 is pivotally mounted within said body with one pre-stop end 61 projecting down into slot 55. An adjusting screw 63 extends through the other end of the pre-stop 61 and is operatively engagable with a portion of said body to thus create stop pressure against the plunger 53 assuring that the clamp remains in locked position when the plunger is projected forwardly. By adjusting the screw 63, a pre-set pressure can be applied to the longitudinal angle of the plunger in its forward position, removing all slop from the plunger and guaranteeing the security of cam pin 41 resting against stop 45 to thus remain in locked position.

In this locked position, the center line of the cam pin 41 is below the longitudinal center line of the plunger, to thus define a locking angle for the handle 37.

While the body of the clamp has been shown as consisting of a pair of symmetrically opposed halves 13 and 15, it is contemplated that body could be a single precision casting which defines the first bore 25 of square cross section, the second intersecting bore define the internal guide walls for the handle and including the opposed pin guide slots 39.

Having described my invention, reference should now be had to the following claims.

I claim:

1. A cam pin plunger clamp comprising a body mountable on a support and including a first longitudinal bore of polygonal cross section;

and a second right angularly related bore at one end of the body intersecting the first bore defining a pair of parallel handle guide walls;

there being opposed cam guide slots formed in said walls adjacent the second bore;

a plunger of similar cross section non-rotatively, reciprocally and guidably positioned in said first bore and at its outer end adapted to mount clamping means;

an L-shaped handle nested in the second bore and at its end pivotally connected to the plunger;

a cam pin projected through the handle intermediate its ends with the pin ends operably and movably nested within the cam guide slots;

and a stop on said body projecting into one guide slot limiting pivotal downward clamping movement of the handle with the plunger projected forwardly;

upward pivotal release movement of said handle moving said cam pin within and along said cam guide slots retracting the plunger.

2. In the cam pin plunger clamp of claim 1, the plunger cross section and first bore being square.

3. In the cam plunger clamp of claim 1, said stop being so located that with the plunger projected to locking position, the center line of the cam pin is below the center line of said plunger creating a locking angle on the handle so that the plunger is locked against retraction.

4. In the cam plunger clamp of claim 1, the pivotal connection between the handle and plunger including a slot at the inner end of the plunger receiving said handle, and a transverse pin interconnecting them.

5. In the cam pin plunger clamp of claim 1, a pre-stop for said plunger including an elongated mill slot on and along its top surface; and a pre-stop screw threaded angularly inward and downward through said body with its end extending into said mill slot and operatively engaging the plunger to apply a pre-set pressure to the longitudinal angle of the plunger in its forward locking position removing all slop from the plunger and guaranteeing securing of the cam pin against its stop to remain in locked position.

6. In the cam pin plunger clamp of claim 1, a pre-stop for said plunger including an elongated slot on and along its top surface; and a pre-stop of L-shape pivotally mounted intermediate its ends within said body for rotation in a vertical plane, one end of the pre-stop extending into the plunger slot adapted to operatively engage the plunger, and an adjustable set screw projecting through the other end of the pre-stop engaging said body to apply a pre-set pressure to the longitudinal angle of the plunger in its forward locking position removing all slop from the plunger and guaranteeing securing of the cam pin against its stop to remain in locked position.

7. In the cam pin plunger clamp of claim 1, the body including a pair of symmetrically opposite halves formed to together define said bores and pin guide slots, and fasteners interconnecting said halves forming a unit body.

8. In the plunger clamp of claim 1, hardened inserts mounted within the cam pin ends and projecting therefrom and engaging said body.

* * * * *